United States Patent Office 2,762,842
Patented Sept. 11, 1956

2,762,842
N-ARYL-N'-AMINOALKYL-UREAS

Franz Hafliger and Walter Schindler, Basel, Switzerland, assignors to J. R. Geigy A. G., Basel, Switzerland, a Swiss company No Drawing. Application June 8, 1953, Serial No. 360,364

Claims priority, application Switzerland June 10, 1952

5 Claims. (Cl. 260—553)

The present invention concerns new N-aryl-N'-aminoalkyl ureas of the general formula:

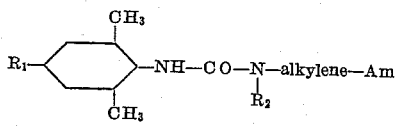

wherein $R_1$ represents hydrogen or the methyl group,
$R_2$ represents hydrogen or a low molecular alkyl group,
Alkylene represent an alkylene radical with 2 or 3 carbon atoms, and
Am represents a low molecular dialkylamino group, an alkylene imino group with 5—6 ring members or the morpholino group.

It has now been found that these compounds have an excellent local anaesthetic action. They are stable not only in a neutral, but also in an alkaline medium, and they are very suitable for injection purposes.

The new compounds can be produced, for example by reacting a reactive functional derivative of 2.6-dimethyl- or 2.4.6-trimethyl-carbonilic acid, by which the alkyl or aryl esters thereof, their amides as well as 2.6-dimethyl- and 2.4.6-trimethyl-phenylisocyanate are to be understood, with a diaminoalkane of the general formula

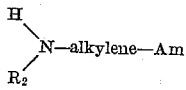

wherein $R_2$, alkylene and Am have the meanings given above. Further, also an N-aryl-N'-halogen alkyl urea of the general formula

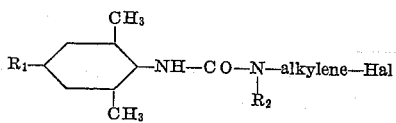

wherein $R_1$, $R_2$ and alkylene have the meanings given above and Hal represents chlorine or bromine can be reacted with a secondary amine of the general formula

wherein Am has the meaning given above. The reaction of an N-aryl-N'-ethylene urea of the general formula:

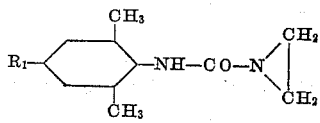

with a secondary amine of the general formula Am—H can be regarded as a particular modification of this process.

N-(β-amino-ethyl)-, N-(β-amino-propyl)-, N-(β-amino-isopropyl)-, N(γ-amino-propyl)-, N-(β-methyl-amino-ethyl)-, N-(β-ethylamino-ethyl)-, N-(β-methylamino-propyl)-, N-(β-methylamino-isopropyl)- and N-(γ-methylamino-propyl)-dimethylamine, -methylethylamine, -dipropylamine, -dibutylamine, -pyrrolidine, -piperidine, -2-methylpiperidine and -morpholine can be regarded as diaminoalkanes which can be used in the process first above mentioned.

The N-aryl-N'-halogenalkyl ureas necessary for the second process can be produced, e. g. by reacting 2.6-dimethyl- or 2.4.6-trimethyl-phenylisocyanate with chloralkyl-, or bromalkylamines. N-(2.6-dimethyl-phenyl)- and N - (2.4.6-trimethyl-phenyl)-N'-(β-chlorethyl)-urea, -N'-(β-bromo-propyl)-urea, -N'-(γ-bromo-propyl)-urea and -N'-(β-chlor-ethyl)-N'-methyl urea can be named for example as individual N-aryl-N'-halogenalkyl ureas. Also N-(2.6-dimethyl-phenyl)- and N-(2.4.6-trimethyl-phenyl)-N'.N'-ethylene urea can be used for example in their stead. These urea compounds can be reacted with any desired secondary amines which correspond to the general formula Am—H, such as dimethylamine, diethylamine, piperidine and morpholine.

With inorganic or organic acids such as hydrochloric acid, hydrobromic acid, sulphuric acid, phosphoric acid, methane sulphonic acid, ethane disulphonic acid, malic acid, succinic acid, tartaric acid, benzoic acid, phthalic acid, the new N-aryl-N'-aminoalkyl ureas form salts which are soluble in water with an almost neutral reaction.

The following examples illustrate the production of the new compounds. Parts are given as parts by weight and the relationship of parts by weight to parts by volume is as that of grammes to cubic centimetres. The temperatures are in degrees centigrade.

Example 1

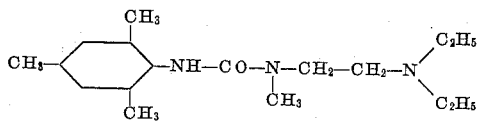

Phosgene is introduced at 90–100° while stirring vigorously into a suspension of 43 parts of mesidine hydrochloride in 450 parts by volume of absolute toluene until a complete solution is attained. The toluene is then distilled off and the residue is fractionated in the vacuum. 37 parts of 2.4.6-trimethylphenylisocyanate are obtained. B. P. 115° under 12 mm. pressure.

The urea compound is produced by the dropwise addition of an ethereal solution of 12 parts of 2.4.6-trimethyl-phenylisocyanate to a solution of 9.8 parts of N.N-diethyl-N'-methyl-ethylene diamine in 25 parts by volume of abs. ether. A strong reaction occurs so that the ether boils. If all the isocyanate has been added, the whole is boiled for 1½ hours under reflux and then the ether is distilled off. If a little pentane is added to the residue, the N-(2.4.6 - trimethyl-phenyl)-N'-methyl-N'-(β-diethylamino-ethyl)-urea soon crystallises. It is recrystallized from pentane. M. P. 68°, hydrochloride M. P. 168–187°.

Example 2

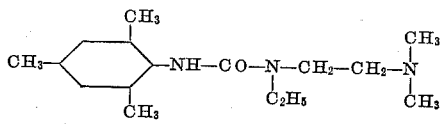

A solution of 6.6 parts of N.N-dimethyl-N'-ethyl-ethylene diamine is added dropwise to a solution of 9.2 parts of 2.4.6-trimethylphenyliscocyanate in 20 parts by volume of abs. ether; on completion of the exothermic reaction, the whole is boiled for 1½ hours under reflux. The basic parts are then extracted with diluted hydrochloric acid, the clear, acid, aqueous phase is made alkaline with concentrated potassium carbonate solution and shaken out with ether. After drying over sodium sulphate, the ether is evaporated and the residue is crystallised from pentane. N - (2.4.6-trimethyl-phenyl)-N'-ethyl-N'-(β-dimethylamino-ethyl)-urea melts at 55°, the hydrochloride melts at 174–175°.

The following can be produced in an analogous manner:

N - (2.4.6 - trimethyl-phenyl) - N' - isopropyl - N' - (β-dimethylamino-ethyl)-urea, M. P. 79–80°, N - (2.4.6 - trimethyl - phenyl) - N' - n - propyl - N' - (β-dimethylamino-ethyl)-urea, M. P. 81–82°, N - (2.4.6 - trimethyl - phenyl) - N' - ethyl - N' - (β - diethylamino-ethyl)-urea, M. P. 48°, N - (2.4.6 - trimethyl - phenyl) - N' - (β - diethylamino-ethyl)-urea, M. P. 130°, N - (2.4.6 - trimethyl - phenyl) - N' - (β - pyrrolidino-ethyl) - urea, N - (2.4.6 - trimethyl - phenyl) - N' - n - propyl - N' - (β-dimethylaminopropyl)-urea, N - (2.4.6-trimethyl - phenyl) - N' - (γ - dimethylaminopropyl)-urea.

Example 3

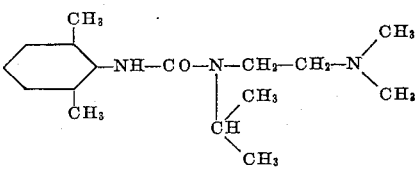

Phosgene is introduced into a suspension of 50 parts of 2.6-xylidine hydrochloride in 250 parts by volume of boiling toluene until a complete solution is attained. The toluene is then distilled off and the residue is fractionated in the vacuum whereupon the 2.6-dimethyl-phenylisocyanate passes over at 91–92° under 13 mm. pressure.

9 parts of 2.6-dimethyl-phenylisocyanate are added dropwise within 10 minutes to a solution of 8 parts of N.N-dimethyl-N'-isopropyl-ethylene diamine in 40 parts by volume of abs. ether. The whole is boiled for 1 hour under reflux and then the ether is distilled off. The oily residue can be crystallised by the addition of petroleum ether. N - (2.6-dimethyl-phenyl)-N'-isopropyl-N'-(β-dimethylamino-ethyl)-urea melts at 89–90°.

The following can be produced in an analogous manner:

N-(2.6-dimethyl-phenyl)-N'-n-propyl-N' - (β - dimethylamino-ethyl)-urea, M. P. 83–84°, N-(2.6-dimethyl-phenyl)-N'-ethyl-N'-(β - dimethylamino-ethyl)-urea, M. P. 68–69°, N-(2.6-dimethyl-phenyl)-N'-methyl - N' - (β - dimethylamino-ethyl)-urea, M. P. 130°, N-(2.6-dimethyl-phenyl)-N'-ethyl-N' - (β - diethylamino-ethyl)-urea, M. P. 55°, N-(2.6-dimethyl-phenyl)-N'-methyl-N'-(β - diethylamino-ethyl)-urea, M. P. 81.5–82°, N-(2.6-dimethyl-phenyl)-N'-(piperidino-ethyl)-urea, M. P. 158°, N-(2.6-dimethyl-phenyl)-N'-methyl-N'-(γ - morpholino-propyl)-urea.

Example 4

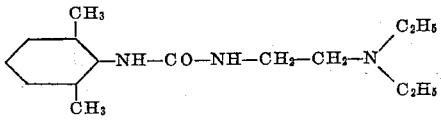

24.2 parts of 2.6-xylidine are suspended in a solution of 10.6 parts of sodium carbonate in 100 parts of water while stirring vigorously and then slowly added dropwise at 0–5° within 1 hour to 21.6 parts of chloroformic acid ethyl ester and finally the whole is stirred for a further 2 hours. The precipitate is then filtered under suction and washed with a little ice water. After recrystallisation from a very little abs. alcohol, the 2.6-dimethyl-phenyl urethane obtained melts at 82–83°.

19.3 parts of this compound and 32 parts by volume of N.N-diethyl-ethylene diamine are boiled for 18 hours under reflux. The excess N.N-diethyl-ethylene diamine is distilled off in the vacuum and the residue is recrystallised from a little absolute alcohol. N-(2.6-dimethyl-phenyl)-N-(β-diethylamino-ethyl)-urea melts at 106°.

Example 5

14.7 parts of 2.6-dimethyl-phenylisocyanate are added dropwise to a benzene solution of β-bromethylamine (the base is liberated from 22 parts of β-bromethylamine hydrobromide). N - (2.6 - dimethyl - phenyl)-N'-(β-bromethyl)-urea immediately begins to separate, the separation is completed by boiling the whole for half an hour. It is then well cooled and filtered off by suction. M. P. 138–139°.

15 parts of this urea compound are boiled under reflux with 40 parts by volume of diethylamine for 3 hours, the excess diethylamine is then distilled off, the residue is taken up in ether and the ethereal solution is thoroughly washed with water. The latter is then shaken out with diluted hydrochloric acid and the hydrochloric acid extract is made alkaline whereupon the basic parts which precipitate are taken up in ether. Upon removal of the solvent, N - (2.6 - dimethyl-phenyl)-N'-(β-diethylamino-ethyl)-urea is obtained which, after recrystallisation from abs. alcohol, melts at 106–107°. A mixture of this compound with a sample according to example 4 has the same melting point.

What we claim is:

1. A member selected from the group consisting of an N-aryl-N'-amino-alkyl urea corresponding to formula

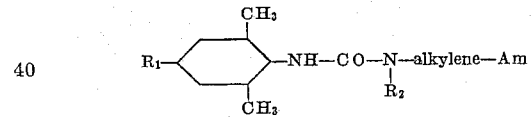

and a non-toxic salt thereof wherein $R_1$ represents a member selected from the group consisting of hydrogen and methyl, $R_2$ represents a low molecular alkyl group, alkylene represents an alkylene radical with at least two and at most three carbon atoms and Am represents a low molecular dialkylamino group.

2. An N-aryl-N'-aminoalkyl-urea corresponding to the formula

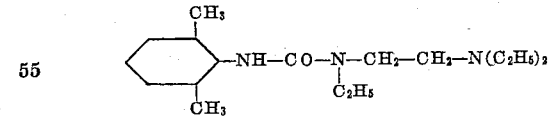

3. An N-aryl-N'-aminoalkyl-urea corresponding to the formula

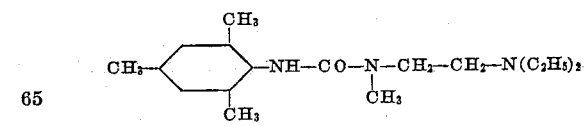

4. An N-aryl-N'-aminoalkyl-urea corresponding to the formula

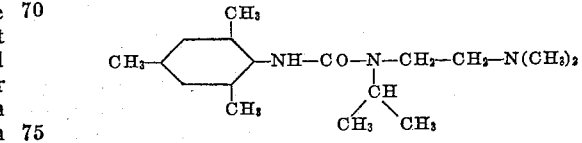

5. An N-aryl-N'-aminoalkyl urea corresponding to the formula
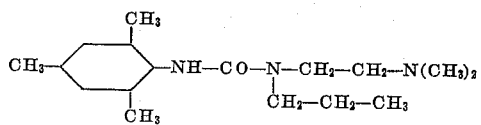
References Cited in the file of this patent
UNITED STATES PATENTS
2,673,878    Cusic ------------------ Mar. 30, 1954
OTHER REFERENCES
Wenker: "JACS," vol. 60 (1938), pp. 158–59.